(12) United States Patent
Zhang et al.

(10) Patent No.: US 8,665,820 B2
(45) Date of Patent: Mar. 4, 2014

(54) METHOD AND APPARATUS FOR NON-ACCESS STRATUM MESSAGE PROCESSING DURING HANDOVER IN EVOLVED NETWORK

(75) Inventors: Hongzhuo Zhang, Shenzhen (CN); Yong Qiu, Shenzhen (CN); Ying Huang, Shenzhen (CN); Qiang Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 179 days.

(21) Appl. No.: 12/704,906

(22) Filed: Feb. 12, 2010

(65) Prior Publication Data

US 2010/0142367 A1   Jun. 10, 2010

Related U.S. Application Data

(63) Continuation of application No. PCT/CN2008/071970, filed on Aug. 13, 2008.

(30) Foreign Application Priority Data

Aug. 13, 2007 (CN) .......................... 2007 1 0140567
Aug. 23, 2007 (CN) .......................... 2007 1 0147031
Nov. 29, 2007 (CN) .......................... 2007 1 0194669

(51) Int. Cl.
  *H04W 4/00* (2009.01)
(52) U.S. Cl.
  USPC ......................................................... 370/331
(58) Field of Classification Search
  USPC .......... 370/331, 228, 352, 332, 355; 455/436, 455/439, 443, 440, 442
  See application file for complete search history.

(56) References Cited

U.S. PATENT DOCUMENTS 6,834,050 B1 * 12/2004 Madour et al. ................ 370/392
7,668,141 B2 *  2/2010 Sayeedi et al. ................ 370/331

(Continued)

FOREIGN PATENT DOCUMENTS

CN   1568049 A   1/2005
CN   1801776 A   7/2006

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," *3GPP*, TS 36.300 V8.1.0 (Jun. 2007).

(Continued)

*Primary Examiner* — Chandrahas Patel

(57) ABSTRACT

A method and an apparatus for non-access stratum (NAS) message processing during handover in an evolved network are provided. The method includes the following steps. An evolved packet core (EPC) receives a message which indicates that a UE is being handed over sent by a source evolved NodeB (S-eNB), and stops sending an NAS message to the UE temporarily. The EPC receives a message which indicates that the UE returns to an S-eNB service area sent by the S-eNB. The EPC sends the NAS message to the UE through the S-eNB, if needed. With the method and the apparatus, the EPC can acquire a location of the UE in time in the case of a handover failure of the UE, a time limit of a retransmission timer is set precisely, and a specific implementation for forwarding an NAS message through an X2 interface is provided.

4 Claims, 14 Drawing Sheets

(56) References Cited

U.S. PATENT DOCUMENTS

| | | | |
|---|---|---|---|
| 8,072,936 B2* | 12/2011 | Shaheen | 370/331 |
| 2008/0031159 A1* | 2/2008 | Jokinen | 370/255 |
| 2008/0184032 A1 | 7/2008 | Li et al. | |
| 2010/0002883 A1 | 1/2010 | Sammour et al. | |
| 2010/0056156 A1 | 3/2010 | Xu et al. | |
| 2010/0279692 A1 | 11/2010 | Hapsari et al. | |

FOREIGN PATENT DOCUMENTS

| | | |
|---|---|---|
| CN | 1992971 A | 7/2007 |
| CN | 101009907 A | 8/2007 |
| CN | 101026861 A | 8/2007 |
| CN | 101309500 A | 11/2008 |
| EP | 2 184 949 A1 | 5/2010 |

OTHER PUBLICATIONS

Extended European Search Report in corresponding European Patent Application No. 08783963.5 (Oct. 6, 2010).

Written Opinion of the International Searching Authority in corresponding PCT Application No. PCT/CN2008/071970 (Nov. 20, 2008).

"NAS forwarding for inter-ENB handover—R3070976," 3GPP TSG-RAN WG3 Meeting #56, May 7-11, 2007, Kobe, Japan.

"NAS message Handling during intra-TLE Handover—R3-070886," 3GPP TSG-RAN WG3 Meeting #56, May 7-11, 2007, Kobe, Japan.

"NAS message handling during mobility—R2071908," 3GPP TSG-RAN2 Meeting #58, May 7-11, 2007, Kobe, Japan.

"NAS message handling during X2 handover—R3071463," 3GPP TSG RAN WG3 Meeting #57, Aug. 20-24, 2007, Athens, Greece.

U.S. Appl. No. 13/269,301, filed Oct. 10, 2011.

International Search Report in corresponding PCT Application No. PCT/CN2008/071970 (Nov. 20, 2008).

Cover page of issued Chinese patent CN 102111835 B, Nov. 7, 2012, 1 page only.

Huawei, "NAS message handling during X2 handover," 3GPP TSG RAN WG3 Meeting #57, R3-071463, Athens, Greece, Aug. 20-24, 2007, total 3 pages.

Search report issued in corresponding EP application No. 12182718.2, Nov. 20, 2012, total 7 pages.

Search report issued in corresponding European application No. EP13170559.2,dated Jul. 1, 2013,total 8 pages.

Search report issued in corresponding European application No. EP13170555.0,dated Jul. 1, 2013,total 7 pages.

\* cited by examiner

METHOD AND APPARATUS FOR NON-ACCESS STRATUM MESSAGE PROCESSING DURING HANDOVER IN EVOLVED NETWORK

CROSS-REFERENCE TO RELATED APPLICATIONS

This application is a continuation of International Patent Application No. PCT/CN2008/071970, filed Aug. 13, 2008, which claims priority to Chinese Patent Application No. 200710194669.9, filed Nov. 29, 2007, Chinese Patent Application No. 200710140567.9, filed Aug. 13, 2007, and Chinese Patent Application No. 200710147031.X, filed Aug. 23, 2007, all of which are hereby incorporated by reference in their entireties.

FIELD OF THE INVENTION

The present invention relates to the field of communication, and more particularly to a method and an apparatus for non-access stratum (NAS) message processing during handover in an evolved network.

BACKGROUND OF THE INVENTION

The Universal Mobile Telecommunications System (UMTS) is a third generation mobile communication system adopting a Wideband Code Division Multiple Access (WCDMA) air interface technique, and the UMTS adopts a structure similar to that of the second generation mobile communication system, including a Radio Access Network (RAN), a Core Network (CN), and User Equipment (UE). The RAN is configured to process all functions associated with wireless communication. The CN is configured to process all speech calling and data connection functions in the UMTS, and perform switching and routing functions with external networks. The RAN in the UMTS system is a UMTS Territorial Radio Access Network (UTRAN).

FIG. 1 is a schematic structural view of a UMTS. The UTRAN includes one and more Radio Network Subsystems (RNSs), in which each RNS is formed by one Radio Network Controller (RNC) and one or more NodeBs. Each RNC is connected with the CN via an Iu interface, each NodeB is connected with the RNC via an Iub interface, and the RNCs are interconnected with each other via an Iur interface. Each RNC is configured to allocate and control wireless resources of the NodeBs connected with the RNC or associated with the RNC, and each NodeB is configured to perform a data stream conversion between the Iub interface and a Uu interface, and meanwhile is participated in part of the wireless resource management.

The network architecture shown in FIG. 1 is based on the architecture of a version earlier than 3GPP Release 6. Considering the competition capability of the network in the future, the 3GPP has been researching on a brand new evolved network architecture to satisfy the application requirements of a mobile network in the future, which includes a system architecture evolvement (SAE) and a long time evolvement (LTE) of the access network, and the network evolvement aims at providing a totally IP-based network with a low delay, high data rate, high system capacity and coverage, and low cost.

FIG. 2 is a schematic architectural view of an evolved network. The network architecture includes a UE, an Evolved UMTS Territorial Radio Access Network (E-UTRAN), and an Evolved Packet Core (EPC). The E-UTRAN is formed by eNodeBs, in which the eNodeBs are connected with each other via an X2 interface. The EPC includes a Mobility Management Entity (MME), a serving SAE gateway, and a Packet Date Network SAE gateway (PDN SAE gateway). The MME is responsible for the mobility management of a control plane, including managing user context and mobility status, assigning a user temporal identifier (ID), and the like. The MME is connected with a Serving GPRS Support Node (SGSN) in an existing network via an S3 interface, connected with the E-UTRAN via an S1-MME interface, and with the Serving SAE Gateway via an S1-U interface. The MME is configured with a timer therein. The Serving SAE Gateway is responsible for initiating a paging for a downlink data in Idle state, managing and saving IP bearer parameters and routing information in a network, and the like. The PDN SAE gateway serves as a user plane anchor point among different access systems. The system shown in FIG. 2 further includes a Policy and Charging Rule Function (PCRF) and a Home Subscriber Server (HSS).

In the evolved network architecture, a handover of X2 interfaces exists between the eNodeBs. If an eNodeB where the UE is currently located is called a Source eNodeB (S-eNB), and an eNodeB where the UE will be handed over to is called a Target eNodeB (T-eNB), the above handover refers a process that the UE is handed over from the S-eNB to a cell controlled by the T-eNB.

In actual applications, the EPC needs to send an NAS message to the UE through the eNodeB to realize a service corresponding to the UE, in which the time point and time interval for sending the NAS message vary with different services. In the conventional art, there is a solution for NAS message processing if the handover is successful. Unfortunately, if the handover fails, no technical solution is available for enabling the EPC to send the NAS message to the UE.

Therefore, in the solution for NAS message processing in the conventional art, the EPC cannot be informed timely if the handover fails, that is, the UE returns to an S-eNB service area again, and as a result, the EPC cannot correctly send the NAS message to the UE.

SUMMARY OF THE INVENTION

Accordingly, the embodiments of the present invention are directed to a method for NAS message processing during handover in an evolved network, an eNodeB, and an MME.

An embodiment of the present invention provides a method for NAS message processing during handover in an evolved network, which includes the following steps.

An EPC sends a direct-transfer message to an S-eNB, in which the direct-transfer message contains an NAS message sent to a UE by the EPC.

The EPC receives a message, which indicates that the UE is being handed over, sent by the S-eNB.

The message which indicates that the UE is being handed over is a direct transfer failure message or a direct transfer response message containing a cause value and the NAS message that fails to be sent.

An embodiment of the present invention provides a method for NAS message processing during handover in an evolved network, which includes the following steps.

An EPC receives a message which, indicates that a UE is being handed over, sent by an S-eNB, and buffers an NAS message to be sent to the UE.

If the handover fails, the EPC receives a message, which indicates that the UE returns to an S-eNB service area, sent by the S-eNB.

When it is necessary to send the NAS message to the UE, the EPC sends the NAS message to the UE through the S-eNB.

An embodiment of the present invention provides a method for NAS message processing during handover in an evolved network, in which a retransmission timer is configured, and the method includes the following steps.

An EPC receives a message, which indicates that a UE is being handed over, sent by an S-eNB, and starts the retransmission timer.

If the handover fails, when it is necessary to send an NAS message to the UE after the retransmission timer expires, the EPC sends the NAS message to the UE through the S-eNB.

An embodiment of the present invention provides an MME in an EPC, and the MME includes a message transceiver module and an execution module.

The message transceiver module is configured to receive a message, which indicates that a UE is being handed over, sent by an S-eNB, and transmit the message to the execution module; receive a message, which indicates that the UE returns to an S-eNB service area, sent by the S-eNB, and transmit the message to the execution module, if the handover fails.

The execution module is configured to receive the message, which indicates that the UE is being handed over, transmitted by the message transceiver module, buffer an NAS message to be sent to the UE; receive the message, which indicates that the UE returns to the S-eNB service area, transmitted by the message transceiver module, and send to the S-eNB the NAS message to be sent to the UE when it is necessary to send the NAS message to the UE.

An embodiment of the present invention provides an MME in an EPC, and the MME includes a retransmission timer, a control module, and an execution module.

The control module is configured to receive a message, which indicates that a UE is being handed over, sent by an S-eNB, and start the retransmission timer; receive a handover complete message sent by a T-eNB, and stop the retransmission timer.

The execution module is configured to resolve a timing result of the retransmission timer, and send an NAS message to the S-eNB when it is necessary to send the NAS message to the UE after the retransmission timer expires, or send the NAS message to the T-eNB when it is necessary to send the NAS message to the UE after the retransmission timer is stopped.

An embodiment of the present invention provides an eNodeB, which includes a detecting module, an NAS message forwarding module, and a handover processing module.

The detecting module is configured to detect an abnormal status during handover of a UE, and send a detecting result to the handover processing module.

The handover processing module is configured to send a message to an EPC which indicates that the UE is being handed over, and send to the EPC a message about a NodeB service area where the UE is currently located according to the detecting result sent by the detecting module when the handover of the UE fails.

The NAS message forwarding module is configured to receive an NAS message sent by the EPC, and forward the message to the UE.

An embodiment of the present invention provides an MME, which includes a message sending module and a message receiving module.

The message sending module is configured to be used by the EPC to send a direct-transfer message to an S-eNB, in which the direct-transfer message contains an NAS message to be sent to the UE by the EPC.

The message receiving module is configured to receive a message which indicates that the UE is being handed over sent by the S-eNB, in which the message which indicates that the UE is being handed over is a direct transfer failure message or a direct transfer response message containing a cause value and the NAS message that fails to be sent.

In view of the above, with the method for NAS message processing during handover in an evolved network, the eNodeB, and the MME provided in the embodiments of the present invention, an EPC sends a direct-transfer message to an S-eNB, and the direct-transfer message contains an NAS message to be sent by the EPC to a UE. The S-eNB notifies the EPC that a message about the UE being currently handed over contains the NAS message that fails to be sent by the S-eNB to the UE, so that the EPC only needs to buffer the NAS message when the NAS message fails to be transferred, so as to reduce the occupied EPC storage space. Alternatively, the S-eNB notifies the EPC that the UE is currently being handed over and notifies the EPC to buffer the NAS message to be sent to the UE. When the handover fails, the S-eNB sends a message which indicates that the UE returns to an S-eNB service area to the EPC, so as to enable the EPC to correctly send the NAS message to the UE. Alternatively, a retransmission timer is set and adopted. When the handover fails, the EPC correctly sends the NAS message to the UE through the S-eNB after the retransmission timer expires, and when the handover is successful, the EPC stops the retransmission timer, and correctly sends the NAS message to the UE through a T-eNB.

DETAILED DESCRIPTION OF THE EMBODIMENTS

In order to make the objectives and advantages of the embodiments of the present invention more comprehensible, the embodiments of the present invention are illustrated below in detail with reference to the accompanying drawings Firstly, a method for NAS message processing during handover in an evolved network according to an embodiment of the present invention is illustrated, which includes two specific methods.

Figure 1:
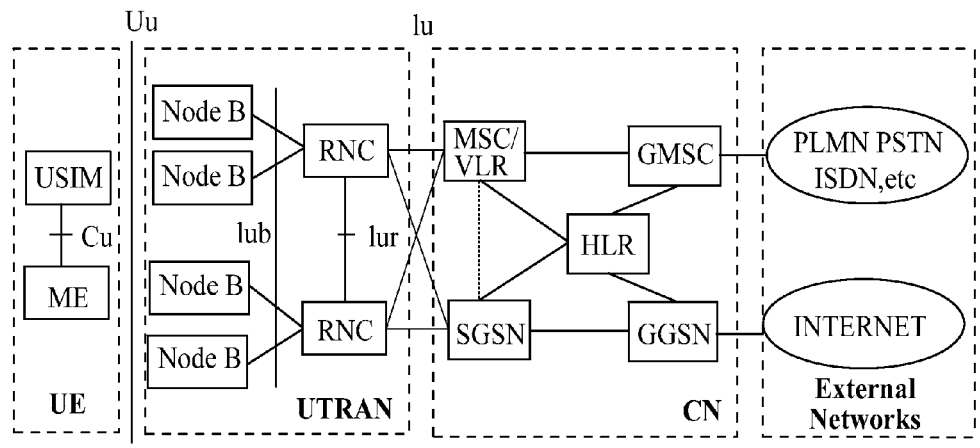
FIG. 1 is a schematic structural view of a UMTS system.
Figure 2:
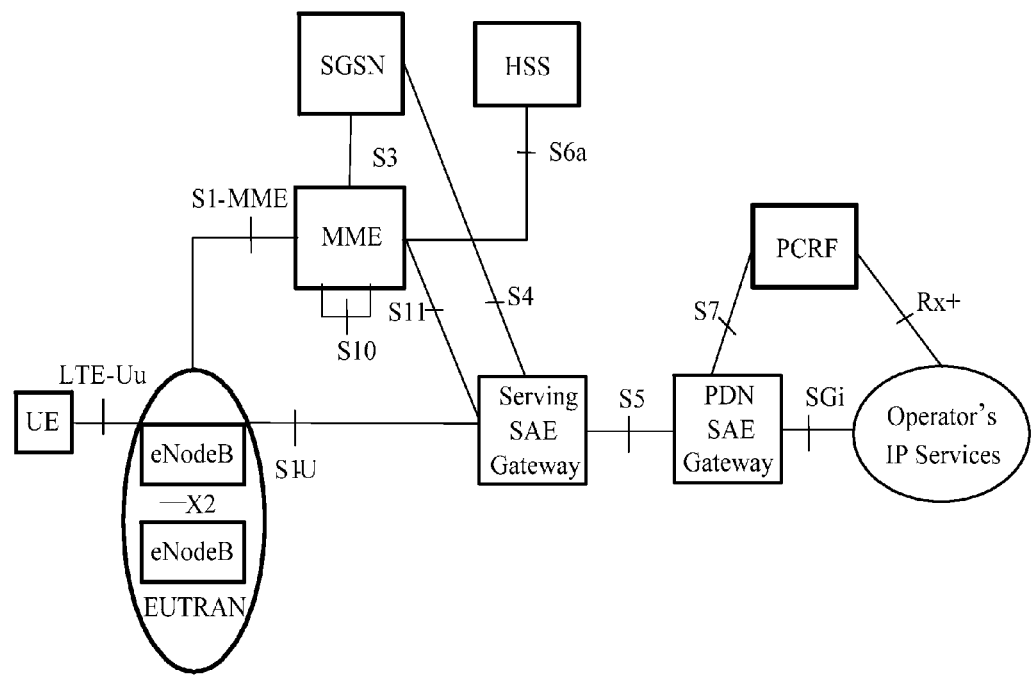
FIG. 2 is a schematic architectural view of an evolved network.
Figure 3:
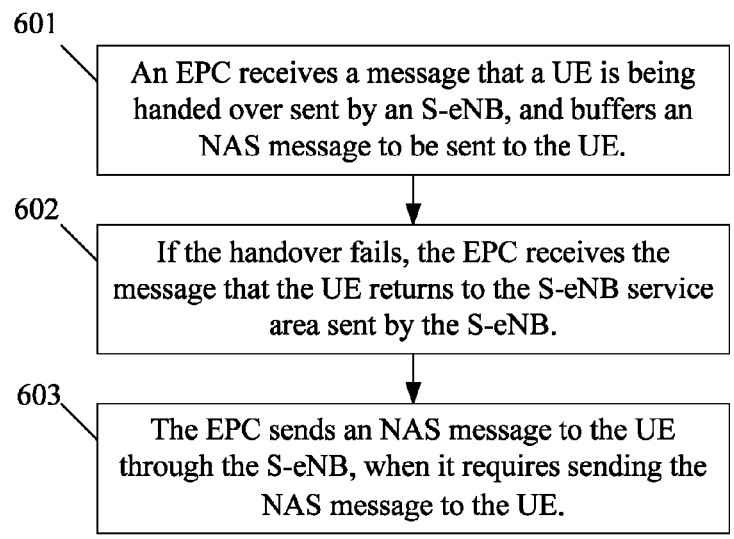
FIG. 3 is a schematic flowchart of a first method for NAS message processing during handover in an evolved network according to an embodiment of the present invention.

FIG. 3 is a schematic flowchart of a first method for NAS message processing during handover in an evolved network according to an embodiment of the present invention, which includes the following steps.

In step 601, an EPC receives a message, which indicates that a UE is being handed over, sent by an S-eNB, and buffers an NAS message to be sent to the UE.

In this step, before the EPC receives the message sent by the S-eNB, this step further includes that the EPC sends a direct-transfer message to the S-eNB, where the direct-transfer message contains the NAS message to be sent to the UE. In this case, the message sent by the S-eNB may be a direct transfer failure message or a direct transfer response message, and the direct transfer failure message or the direct transfer response message may contain a cause value, for example, the UE is being handed over, and may further contain the NAS message received by the S-eNB from the EPC. The NAS message may be an NAS message received from the EPC before the S-eNB sends a handover command to the UE, or an NAS message received from the EPC after the S-eNB sends a handover command to the UE. Alternatively, after the S-eNB sends a handover command to the UE, the EPC does not send an NAS message, and the S-eNB directly sends a handover notification message to the EPC, and in this case, the EPC directly acquires that the UE is being handed over.

If the handover fails, the UE returns to an S-eNB service area, and the S-eNB sends a message which indicates that the UE returns to the S-eNB service area to the EPC.

In step 602, if the handover fails, the EPC receives the message which indicates that the UE returns to the S-eNB service area sent by the S-eNB.

In step 603, the EPC sends an NAS message to the UE through the S-eNB, when it is necessary to send the NAS message to the UE.

In this step, after the EPC acquires that the UE currently returns to the S-eNB service area in step 602, when it is necessary to send the NAS message to the UE, the EPC sends the NAS message to the UE through the S-eNB. Considering the sending mode, the EPC sends to the S-eNB the direct-transfer message containing the NAS message to be sent to the UE by the EPC, and then the S-eNB sends the NAS message to the UE by using a Radio Resource Control (RRC) message downlink direct-transfer message.

Through step 601-step 603, the flow of the first method for NAS message processing during handover in an evolved network according to an embodiment of the present invention is ended. In this flow, the S-eNB sends a handover command to the UE, that is, the NAS message processing manner after the handover begins.

The specific interaction processes involved during the handover, for example, sending, by the S-eNB, a handover request to a T-eNB, and performing, by the T-eNB, an admission control, all belong to the common sense for those of ordinary skill in the art, which are not repeated in the above method of the embodiment of the present invention and the subsequent descriptions.

In the first method for NAS message processing during handover in an evolved network according to an embodiment of the present invention, when the handover fails, the EPC receives the message, which indicates that the UE returns to the S-eNB service area, sent by the S-eNB, and since the EPC has acquired the exact position of the UE currently, when it is necessary to send the NAS message to the UE, the EPC sends the NAS message to the UE through the S-eNB, thereby realizing the effect of sending the NAS message correctly to the UE when the handover fails.

Figure 4:
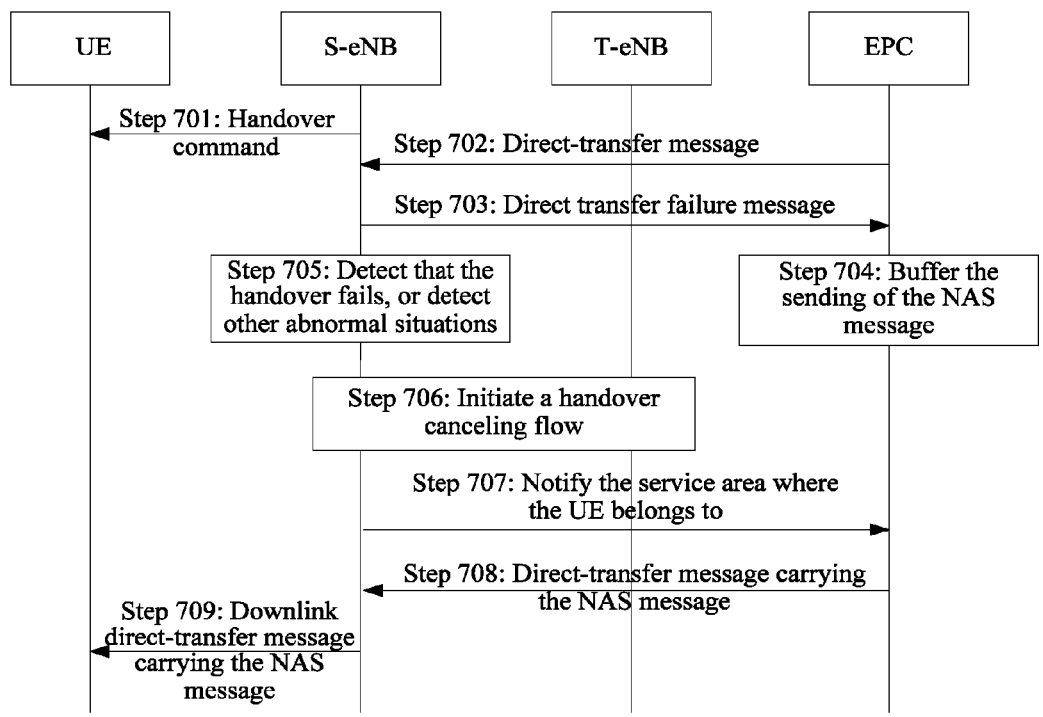
FIG. 4 is a schematic flowchart of a first preferred embodiment of the flow shown in FIG. 3.

FIG. 4 is a schematic flow chart of a first preferred embodiment of the flow shown in FIG. 3, which shows a complete process from sending, by the S-eNB, the handover command to the UE till the NAS message processing after the handover begins. The flow shown in FIG. 4 includes the following steps.

In step 701, the UE receives a handover command message sent by the S-eNB, and the message instructs the UE to complete the handover process.

In step 702, the EPC sends the direct-transfer message to the S-eNB, and the direct-transfer message contains the NAS message to be sent to the UE.

In step 703, the S-eNB founds that the UE is no longer located in a service area of the S-eNB, and the S-eNB sends the direct transfer failure message or direct transfer response message to the EPC. The direct transfer failure message or direct transfer response message contains a cause value, for example, the UE is being handed over, and may further contain the NAS message received by the S-eNB from the EPC. The NAS message may be received from the EPC before the S-eNB sends a handover command to the UE, or may be received from the EPC after the S-eNB sends a handover command to the UE.

In step 704, the EPC buffers the sending of the NAS message after receiving the direct transfer failure message or direct transfer response message.

In step 705, the S-eNB detects that the handover fails, or detects other abnormal situations.

In step 706, the S-eNB initiates a handover canceling flow to the T-eNB.

In step 707, the S-eNB sends a message containing a current position of the UE to the EPC, that is, notifies the EPC that the UE returns to the S-eNB service area.

In step 708, the EPC sends to the S-eNB the NAS message to be sent to the UE when it is necessary to send the NAS message to the UE.

In step 709, the S-eNB forwards the NAS message sent by the EPC to the UE by using an RRC message downlink direct-transfer message.

Step 702 may be performed before step 701, that is, there is no strict sequence relation between step 701 and step 702.

Step 706 may be an optional step, that is, this embodiment may not include step 706. If step 706 is included, there is no strict sequence relation between step 706 and step 707 during execution.

In step 707, the message containing the current position of the UE sent by the S-eNB to the EPC may be an existing S1 interface message, or may be a new message, as long as the message can be adopted to notify the EPC that the UE returns to the S-eNB service area currently. Table 1 shows a format of the above message.

TABLE 1

| Cell/Group Name | Type | Type Reference | Symbol Description |
|---|---|---|---|
| Message Type | Mandatory | | |
| MME Application Part Protocol Identifier | Mandatory | Integer, String | Indicating a receiving end of messages |
| ENodeB Identifier | Mandatory | Integer, String | Indicating identifier of the eNodeB itself |
| Cause | Optional | Integer, Enumerated | Indicating a cause value |

In this preferred embodiment, the S-eNB sends the message containing the current position of the UE to the EPC, so that the EPC is able to acquire the position of the UE correctly when the handover fails.

Figure 5:
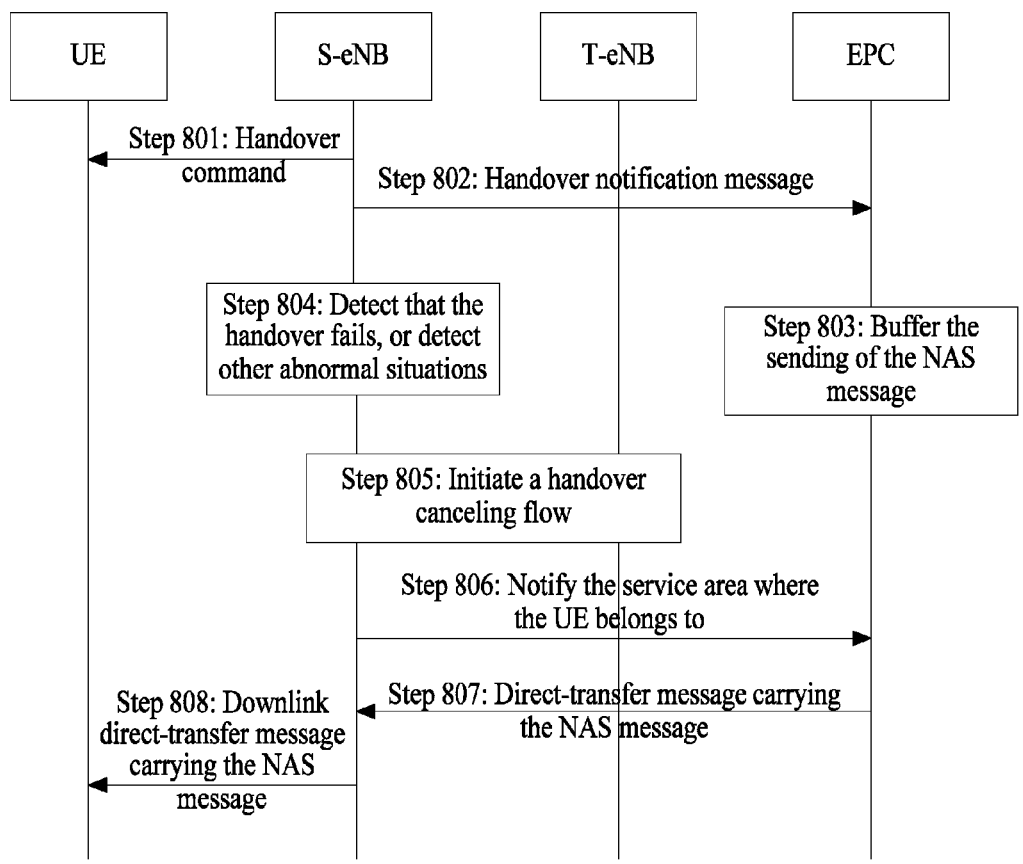
FIG. 5 is a schematic flowchart of a second preferred embodiment of the flow shown in FIG. 3.

FIG. 5 is a schematic flow chart of a second preferred embodiment of the flow shown in FIG. 3, which shows a process from initiating the handover till finishing the NAS message processing after the handover begins. The flow shown in FIG. 5 includes the following steps.

Step 801 is the same as step 701.

In step 802, the S-eNB sends a handover notification message to the EPC, so as to notify the EPC that the UE is currently being handed over.

In step 803, the EPC buffers the sending of the NAS message after receiving the handover notification message.

Steps 804-808 are respectively the same as steps 705-709.

Similar to the first preferred embodiment, step 805, in which the S-eNB initiates a handover canceling flow to the T-eNB, is an optional step, and there is not strict sequence relation between step 805 and step 806.

In step 806, the same as step 707, the message containing the current position of the UE sent by the S-eNB to the EPC may be an existing S1 interface message, or may be a new message, as long as the message can be adopted to notify the EPC that the UE returns to the S-eNB service area currently. Table 1 shows a format of the above message.

In step 802, the handover notification message sent by the S-eNB to the EPC may have various formats, and Table 2 has listed one specific format of the above handover notification message.

TABLE 2

| Cell/Group Name | Type | Type Reference | Symbol Description |
|---|---|---|---|
| Message Type | Mandatory | | |
| MME Application Part Protocol Identifier | Mandatory | Integer, String | Indicating a receiving end of messages |
| ENodeB Identifier | Mandatory | Integer, String | Indicating the identifier of the eNodeB |
| Cause | Optional | Integer, Enumerated | Indicating a cause value |

The difference between the above flow shown in FIG. 5 and that shown in FIG. 4 lies in that, in the flow shown in FIG. 5, the S-eNB directly notifies the EPC that the UE is being handed over, rather than sending the direct transfer failure message or direct transfer response message to notify the EPC that the UE is being handed over after the EPC sends the direct-transfer message. Thus, when the handover fails, the S-eNB directly notifies the EPC of the current position of the UE, which is much simpler than the mode of first receiving the direct transfer message sent by the EPC and then returning the direct transfer failure message or direct transfer response message to notify the EPC of the current position of the UE.

Figure 6:
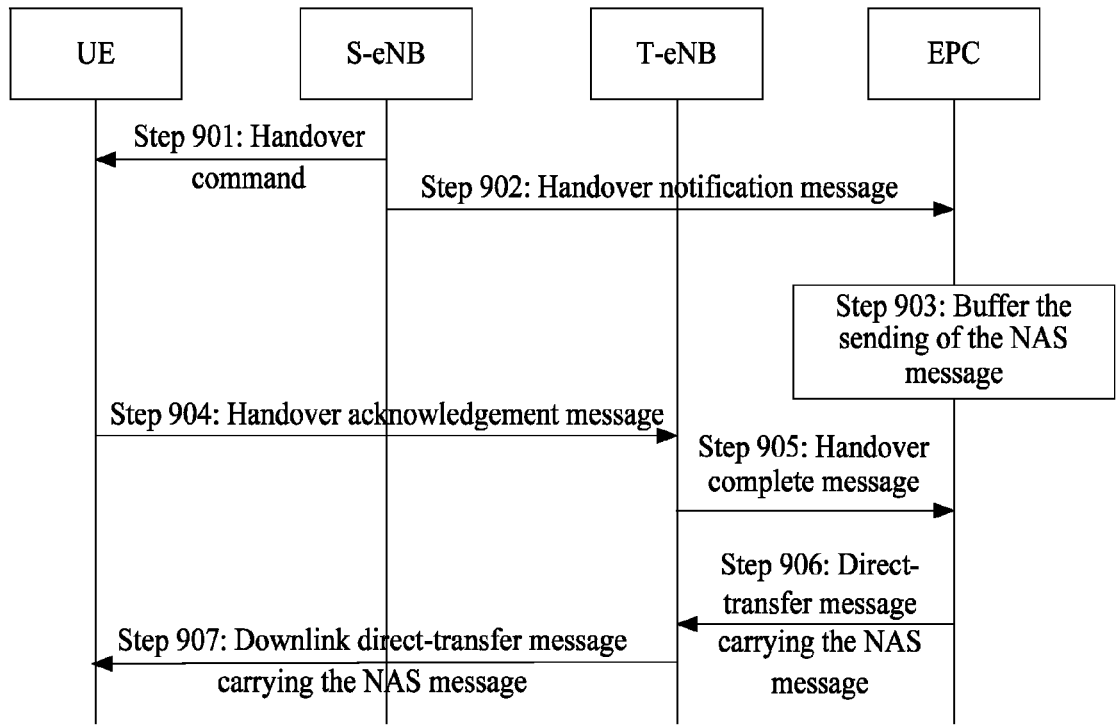
FIG. 6 is a schematic flowchart of the flow, when the handover is successful, included in the flow shown in FIG. 3.

The flow shown in FIG. 3 may further include the processing flow when the handover is successful. FIG. 6 shows a complete processing flow when the handover is successful. The flow includes the following steps.

Steps 901-903 are the same as steps 801-803.

In step 904, the UE sends a handover acknowledgement message to the T-eNB, so as to indicate that the handover is completed.

In step 905, the T-eNB sends a handover complete message to the EPC, so as to notify the EPC that the UE has completed the handover.

In step 906, the EPC sends the direct-transfer message to the T-eNB when it is necessary to send the NAS message to the UE, and the direct-transfer message contains the NAS message to be sent to the UE.

In step 907, the T-eNB sends the NAS message to the UE by using an RRC downlink direct-transfer message.

Different from the handover failure situation, if the above handover is successful, the T-eNB sends a handover complete message to the EPC, which is equivalent to notifying the EPC that the UE enters a T-eNB service area currently, so as to instruct the EPC to send the NAS message to the UE through the T-eNB.

The flows of two preferred embodiments of the above first method for NAS message processing during handover in an evolved network according to an embodiment of the present invention have been described above.

Figure 7:
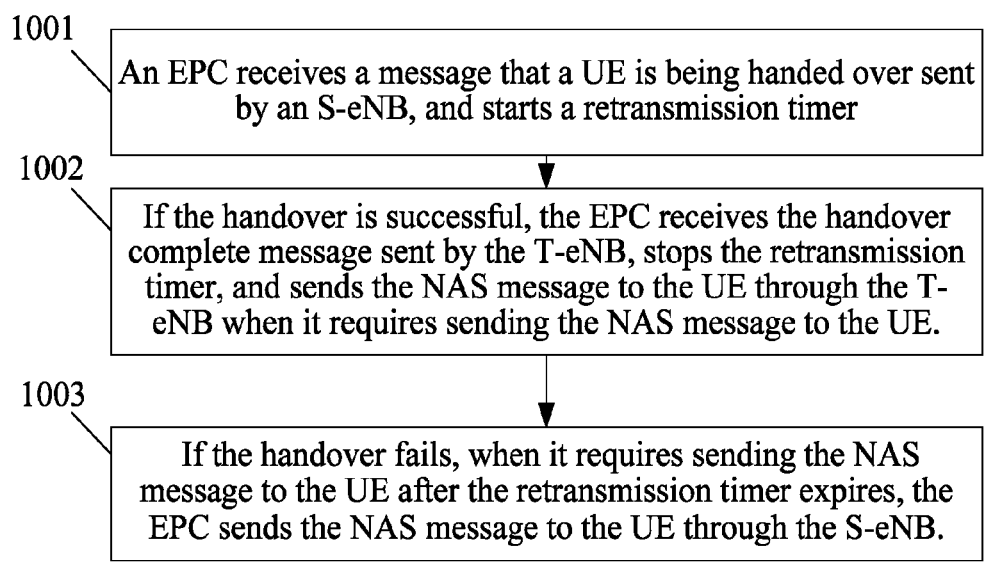
FIG. 7 is a schematic flowchart of a second method for NAS message processing during handover in an evolved network according to an embodiment of the present invention.

FIG. 7 is a schematic flow chart of a second method for NAS message processing during handover in an evolved network according to an embodiment of the present invention. The flow includes the following steps.

In step 1001, an EPC receives a message, which indicates that a UE is being handed over, sent by an S-eNB, and starts a retransmission timer.

In this step, before the EPC receives the message sent by the S-eNB, this step further includes that the EPC sends a direct-transfer message to the S-eNB, and the direct-transfer message contains an NAS message to be sent to the UE. In this case, the message sent by the S-eNB may be a direct transfer failure message or direct transfer response message. The direct transfer failure message or direct transfer response message may contain a cause value, for example, the UE is being handed over, and may further contain the NAS message received by the S-eNB from the EPC. The NAS message may be received from the EPC before the S-eNB sends a handover command to the UE, or may be received from the EPC after the S-eNB sends a handover command to the UE.

The receiving, by the EPC, the message sent by the S-eNB may further includes receiving, by the EPC, a handover notification message directly sent by the S-eNB without sending a direct-transfer message by the EPC, and in this case, the EPC directly acquires that the UE is being handed over. In this step, the started retransmission timer may be an S1 application part (S1-AP) protocol retransmission timer, or may be another retransmission timer.

In step 1002, if the handover is successful, the EPC receives the handover complete message sent by the T-eNB, stops the retransmission timer, and sends the NAS message to the UE through the T-eNB when it is necessary to send the NAS message to the UE.

In step 1003, if the handover fails, when it is necessary to send the NAS message to the UE after the retransmission timer expires, the EPC sends the NAS message to the UE through the S-eNB.

In this step, if the EPC does not receive the handover complete message from the UE after the retransmission timer expires, it is considered that the UE is still located in the S-eNB service area. In this case, when it is necessary to send the NAS message to the UE, the EPC sends the NAS message to the UE through the S-eNB. Considering the sending mode, the EPC sends to the S-eNB a direct-transfer message containing the NAS message to be sent to the UE, and then the S-eNB sends the NAS message to the UE by using an RRC message downlink direct-transfer message.

In the second method for NAS message processing during handover in an evolved network according to an embodiment of the present invention, a retransmission timer is disposed in the EPC, and when the handover fails, the EPC can correctly send the NAS message to the UE when it is necessary to send the NAS message to the UE after the retransmission timer expires. When the handover is successful, the EPC stops the retransmission timer after receiving the handover complete message, and then sends the NAS message through the T-eNB.

In step 1001, the message which indicates that the UE is being handed over received by the EPC may further contain time information. If the time is synchronous between the S-eNB and the EPC, the time information may be a time point when the S-eNB sends the handover command to the UE, or a time point when the S-eNB receives the direct-transfer message, or returns the direct transfer failure message, and the like. If the time is asynchronous between the S-eNB and the EPC, the time information may be a time interval between sending the handover command to the UE and receiving the direct-transfer message by the S-eNB. In this case, in step 1001, a time limit of the retransmission timer may be determined according to the time information, and then the retransmission timer is started, so as to accurately determine the time limit of the retransmission timer.

Figure 8:
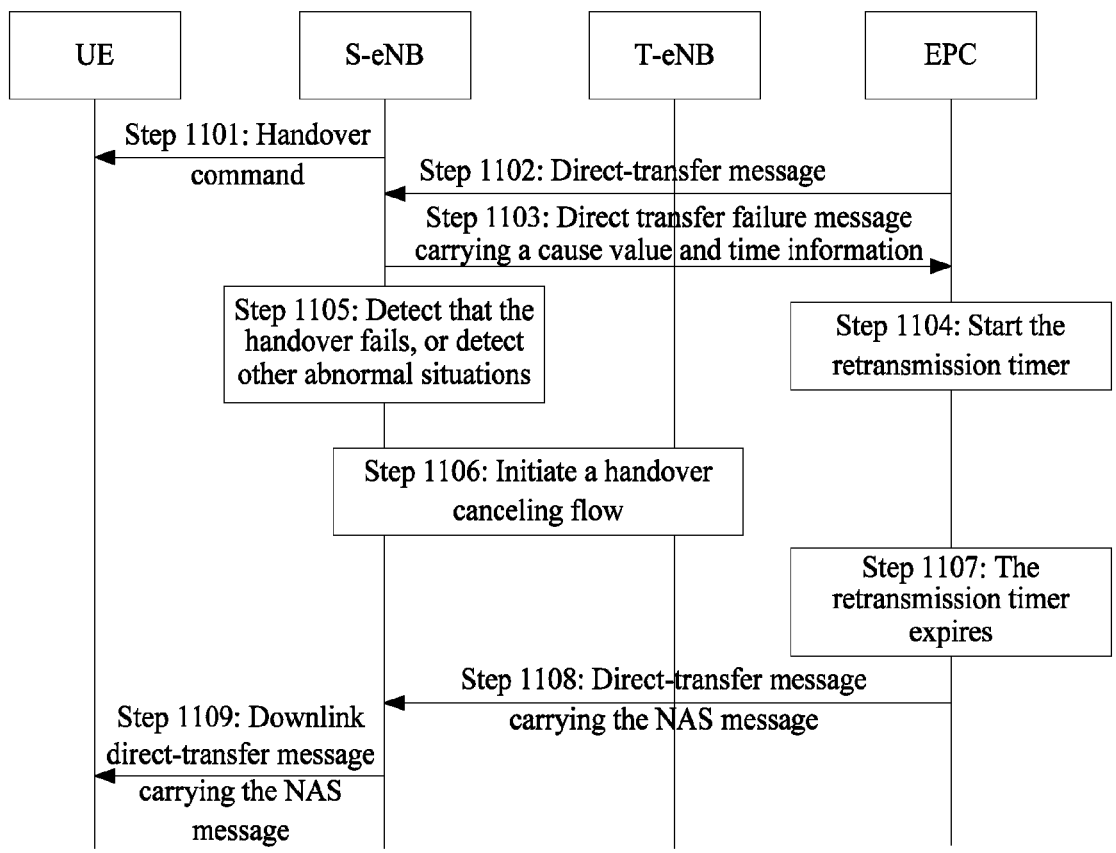
FIG. 8 is a schematic flowchart of a preferred embodiment of the flow shown in FIG. 7.

A preferred embodiment is provided for the second method for NAS message processing during handover in an evolved network. FIG. 8 shows a flow of a preferred embodiment of the flow shown in FIG. 7, which is a processing flow when the handover fails, and includes the following steps.

In step 1101, the UE receives a handover command message sent by the S-eNB, and the message instructs the UE to complete the handover process.

In step 1102, the EPC sends the direct-transfer message to the S-eNB, and the direct-transfer message contains the NAS message to be sent to the UE.

In step 1103, the S-eNB found that the UE is no longer located in a service area of the S-eNB, and sends the direct transfer failure message or direct transfer response message to the EPC, and the direct transfer failure message or direct transfer response message contains a cause value and time information. The direct transfer failure message or direct transfer response message may further contain the NAS message received by the S-eNB from the EPC. The NAS message may be received from the EPC before the S-eNB sends a handover command to the UE, or may be received from the EPC after the S-eNB sends a handover command to the UE.

In step 1104, if the message contains the time information, according to the time information carried in the direct transfer failure message or direct transfer response message and based on the experience value, the EPC determines a time length of the handover process of the UE, thus determining a time limit of the retransmission timer, starting the retransmission timer, and stopping sending the NAS message temporarily.

In step 1105, the S-eNB detects that the handover fails, or detects other abnormal situations.

In step 1106, the S-eNB initiates a handover canceling flow to the T-eNB.

In step 1107, the retransmission timer in the EPC expires.

In step 1108, when it is necessary to send the NAS message to the UE, the EPC sends the direct-transfer message to the S-eNB, and the direct-transfer message contains the NAS message to be sent to the UE.

In step 1109, the S-eNB sends the NAS message to the UE by using an RRC message downlink direct-transfer message.

Step 1102 may be performed before step 1101, that is, there is no strict sequence relation between step 1101 and step 1102.

Step 1106 is an optional step, and there is no strict sequence relation between step 1106 and steps 1107-1108.

In step 1103, the direct transfer failure message or direct transfer response message sent to the EPC by the S-eNB not only contains the cause value, but also contains the time information. A message format of the direct transfer failure message or direct transfer response message is listed in Table 3.

TABLE 3

| Cell/Group Name | Type Reference | | Symbol Description |
|---|---|---|---|
| Message Type | Mandatory | | |
| MME Application Part Protocol Identifier | Mandatory | Integer, String | Indicating a receiving end of messages |
| ENodeB Identifier | Optional | Integer, String | Indicating the identifier of the eNodeB |
| Cause | Optional | Integer, Enumerated | Cause value |
| Time Information | Mandatory | Integer, String | Time information |
| Time Stamp | Optional | Integer, String | Time stamp |
| Time Interval | Optional | Integer | Time interval |

Similarly, in the flow shown in FIG. 8, after the UE begins to be handed over, the S-eNB directly notifies the EPC that the UE is currently being handed over, rather than receiving the direct-transfer message sent by the EPC and then notifying the EPC that the UE is currently handed over through the direct transfer failure message or direct transfer response message. Thus, the flow is simplified.

Next, a method for forwarding an NAS message during handover in an evolved network according to an embodiment of the present invention is described below.

Figure 9:
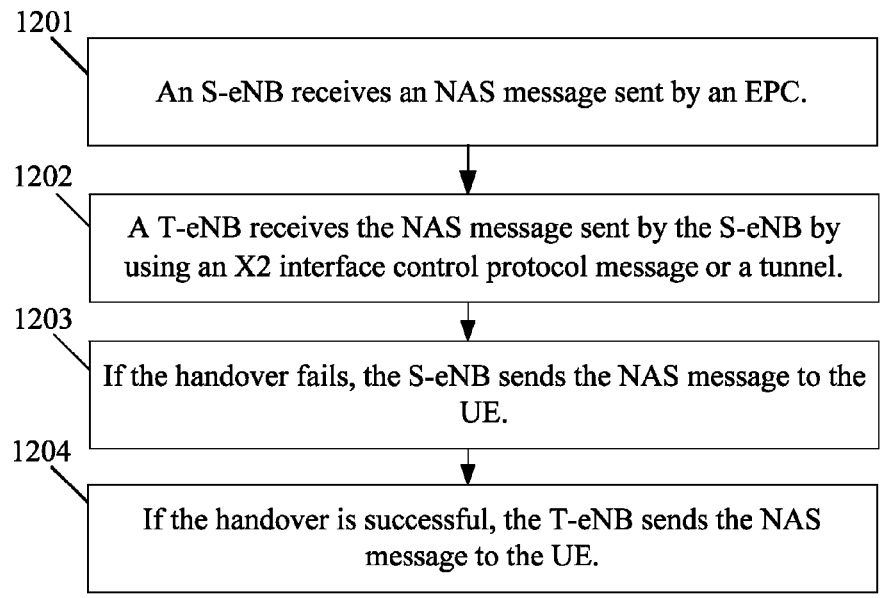
FIG. 9 is a schematic flowchart of a method for NAS message processing during handover in an evolved network according to an embodiment of the present invention.

FIG. 9 is a schematic flow chart of a method for NAS message processing during handover in an evolved network according to an embodiment of the present invention. The flow includes the following steps.

In step 1201, an S-eNB receives an NAS message sent by an EPC. The NAS message may be received from the EPC before the S-eNB sends a handover command message to a UE, or received from the EPC after the S-eNB sends a handover command message to the UE.

In step 1202, a T-eNB receives the NAS message sent by the S-eNB by using an X2 interface control protocol message or a tunnel. The S-eNB may send the NAS message by containing the NAS message in an RRC message, for example, an RRC downlink direct-transfer message, or may send the NAS message directly.

In step 1203, if the handover fails, the S-eNB sends the NAS message to the UE.

In step 1204, if the handover is successful, the T-eNB sends the NAS message to the UE.

In the method for NAS message processing during handover in an evolved network according to an embodiment of the present invention, the NAS message may be borne in the X2 interface control protocol message, and may be forwarded between the S-eNB and the T-eNB via the X2 interface control message, or forwarded via a tunnel between the S-eNB and the T-eNB, which are specific implementations for forwarding the NAS message at the X2 interface.

The above X2 interface control protocol message may have different alternative forms. By taking an X2-AP control protocol message and a GTP-C control protocol message as examples below, two preferred embodiments of the first method for NAS message processing during handover in an evolved network according to an embodiment of the present invention are described below.

Figure 10:
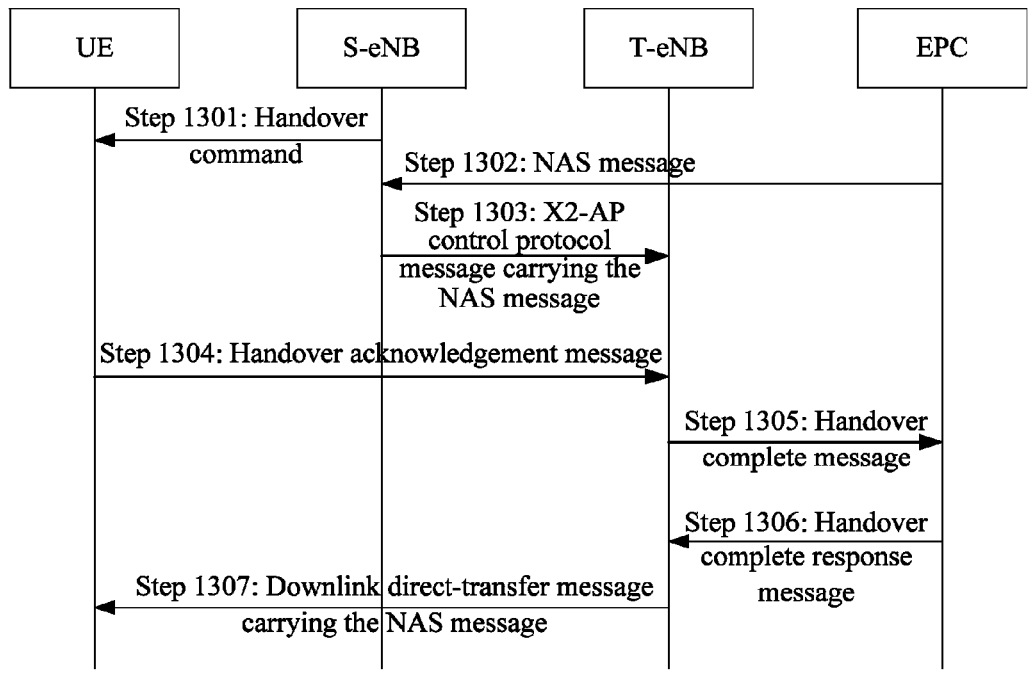
FIG. 10 is a schematic flowchart of a first preferred embodiment of the flow show in FIG. 9.

FIG. 10 is a schematic flow chart of a first preferred embodiment of the flow shown in FIG. 9. The flow shown in FIG. 10 includes the following steps.

In step 1301, the UE receives the handover command message sent by the S-eNB, and the message instructs the UE to complete the handover process.

In step 1302, the EPC sends a downlink direct-transfer message to the S-eNB, and the downlink direct-transfer message contains the NAS message to be sent to the UE.

In step 1303, the S-eNB sends the received NAS message to the T-eNB. Specifically, the S-eNB sends the received NAS message to the T-eNB in a cell format by bearing the NAS message in the X2-AP control protocol message. The S-eNB forwards the NAS message by containing the NAS message in an RRC message, for example, an RRC downlink direct-transfer message, or forwards the NAS message directly.

In step 1304, the UE sends a handover acknowledgement message to the T-eNB.

In step 1305, the T-eNB sends a handover complete message to the EPC, so as to notify the EPC that the UE has completed the handover process.

In step 1306, the EPC sends a handover complete response message to the T-eNB, so as to confirm that the handover is completed.

In step 1307, the T-eNB sends the NAS message to the UE by using the RRC downlink direct-transfer message.

In the flow shown in FIG. 10, step 1302 may be performed before step 1301.

In the flow shown in FIG. 10, step 1307 may be performed immediately after step 1304 or step 1305.

The X2-AP control protocol message in step 1303 may be an application layer message exclusively added at the X2 interface, and a message format of such message is listed in Table 4.

TABLE 4

| Cell/Group Name | Type Reference | Symbol Description |
|---|---|---|
| Message Type | Mandatory | |
| S-eNB Identifier | Mandatory | Indicating a receiving end of messages |
| T-eNB Identifier | Mandatory | Indicating identifier of the T-eNB itself |
| NAS Message | Mandatory  String | Indicating forwarded NAS message |

Figure 11:
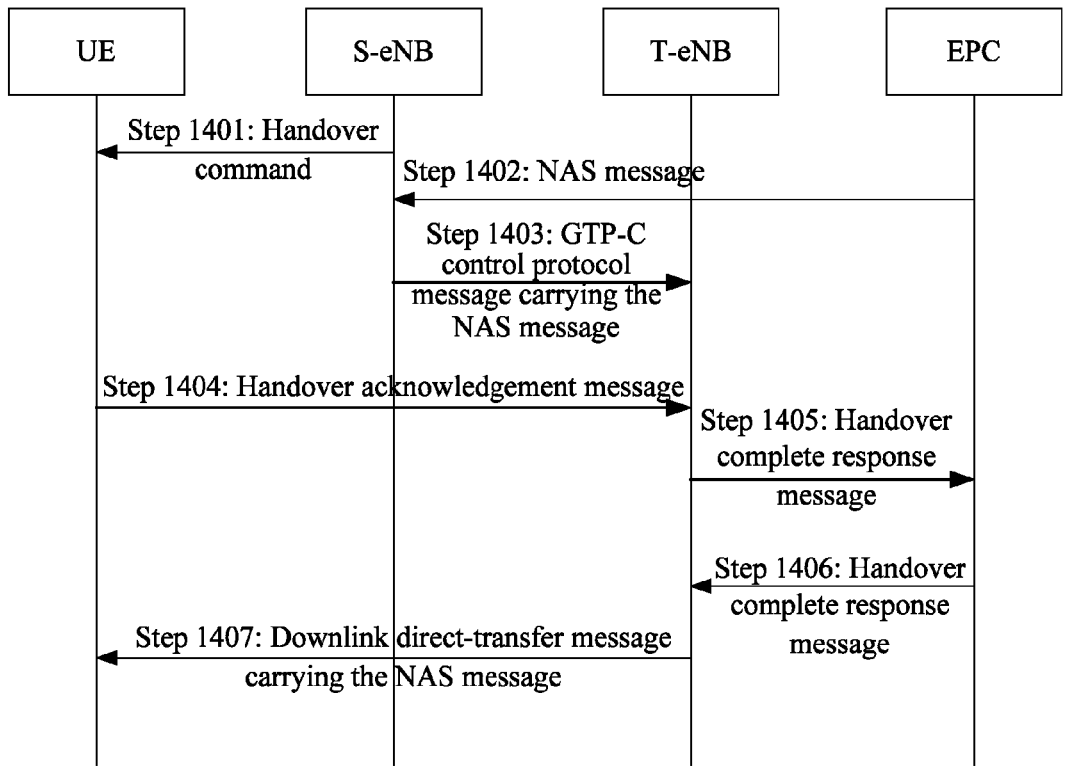
FIG. 11 is a schematic flowchart of a second preferred embodiment of the flow shown in FIG. 9.

FIG. 11 is a schematic flow chart of a second embodiment of the flow shown in FIG. 9. The flow shown in FIG. 11 includes the following steps.

Steps 1401-1402 are the same as steps 1301-1302, and steps 1404-1407 are the same as steps 1304-1307.

The difference between the flow shown in FIG. 11 and the flow shown in FIG. 10 lies in that, in step 1403 of FIG. 11, the S-eNB sends the received NAS message to the T-eNB, and specifically, the S-eNB sends the received NAS message by bearing the NAS message in the GTP-C control protocol message. The S-eNB forwards the NAS message by containing the NAS message in an RRC message, for example, an RRC downlink direct-transfer message, or forwards the NAS message directly.

The GTP-C control protocol message may be a user plane message exclusively added at the X2 interface, and a message format of such message is listed in Table 5.

TABLE 5

| Cell/Group Name | Type Reference | Symbol Description |
|---|---|---|
| Message Type | Mandatory | Indicating an identifier of a newly-added GTP-C message |
| NAS message | Mandatory  Binary String | Indicating a forwarded NAS message |

Figure 12:
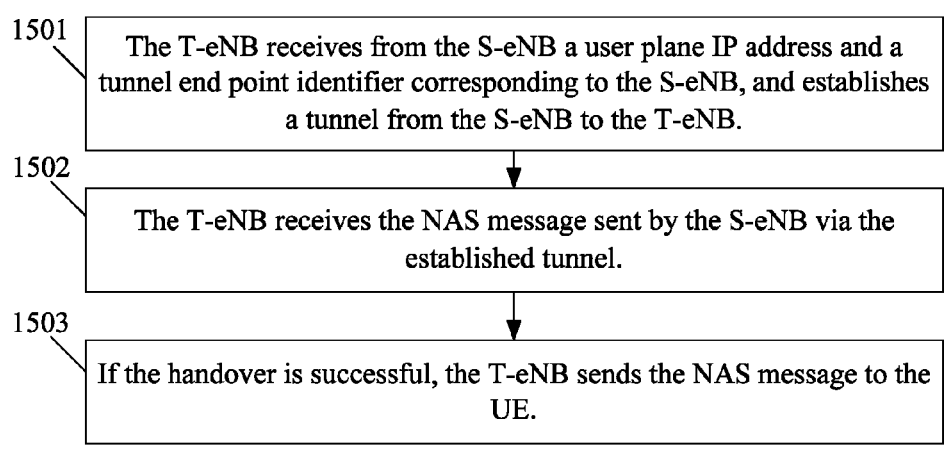
FIG. 12 is a schematic flowchart of a T-eNB further receiving an NAS message sent by an S-eNB via a tunnel in the flow shown in FIG. 9.

In the flow shown in FIG. 9, the T-eNB may further receive the NAS message sent by the S-eNB via a tunnel. FIG. 12 is a schematic flow chart of the flow shown in FIG. 9, in which a T-eNB further receives an NAS message sent by an S-eNB via a tunnel. The flow shown in FIG. 12 includes the following steps.

In step 1501, the T-eNB sends a user plane IP address and a tunnel end point identifier corresponding to the T-eNB to the S-eNB, and establishes a tunnel from the S-eNB to the T-eNB.

In step 1502, the T-eNB receives the NAS message sent by the S-eNB via the established tunnel. The S-eNB may forward the NAS message by containing the NAS message in an RRC message, for example, an RRC downlink direct-transfer message, or forward the NAS message directly.

In step 1503, if the handover is successful, the T-eNB sends the NAS message to the UE.

The established tunnel may be a tunnel exclusively configured to forward an NAS message, or may be a tunnel configured to transmit user data, which is shared for forwarding the NAS message. The difference there-between lies in that, the tunnel end point identifier sent by the S-eNB to the T-eNB when the tunnel is established is a tunnel end point identifier configured to forward the NAS message or a tunnel end point identifier configured to transmit the user data. Thus, depending upon different tunnel end point identifiers, different tunnels are respectively established. By taking the above two tunnels as examples, two preferred embodiments of the second method for NAS message processing during handover in an evolved network according to an embodiment of the present invention are illustrated below.

The above established tunnel is a unidirectional tunnel from the S-eNB to the T-eNB. If the handover process fails, the T-eNB may further return the NAS message to the S-eNB, and in this case, a tunnel from the T-eNB to the S-eNB is further required.

Figure 13:
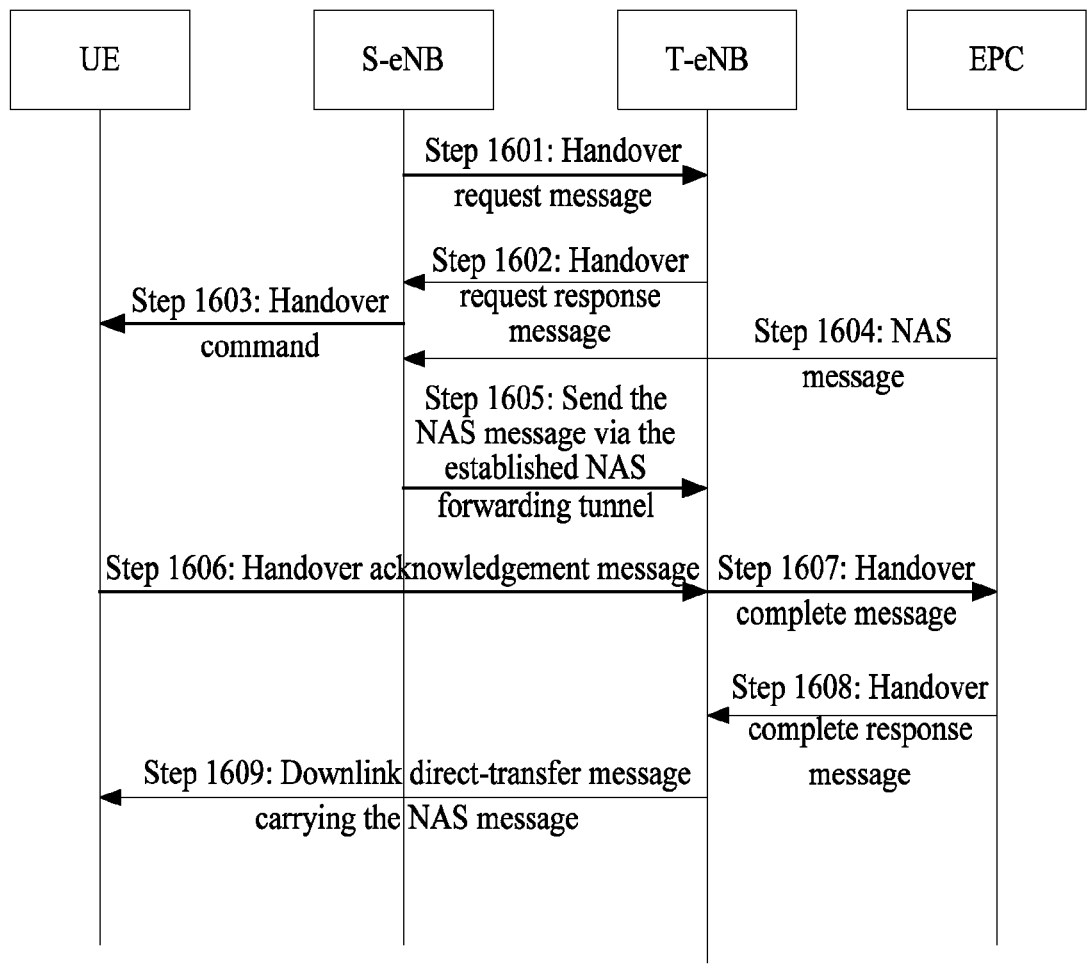
FIG. 13 is a schematic flowchart of a first preferred embodiment of the flow shown in FIG. 12.

FIG. 13 is a schematic flow chart of a first preferred embodiment of the flow shown in FIG. 12. The flow shown in FIG. 13 includes the following steps.

In step 1601, the S-eNB sends a handover request message to the T-eNB.

If the failure of the handover process is considered in this flow, the T-eNB returns the NAS message to the S-eNB. At this time, the handover request message in step 1601 may contain a user plane IP address of the S-eNB and a tunnel end point identifier configured to forward the NAS message.

In step 1602, the T-eNB sends a handover request response message to the S-eNB, and the message contains a user plane IP address of the T-eNB and a tunnel end point identifier configured to forward the NAS message.

Through steps 1601-1602, a NAS forwarding tunnel is established, which may be a unidirectional tunnel or a bi-directional tunnel.

In step 1603, the UE receives the handover command message sent by the S-eNB, and the message instructs the UE to complete the handover process.

In step 1604, the EPC sends a downlink direct-transfer message to the S-eNB, and the downlink direct-transfer message contains the NAS message to be sent to the UE.

In step 1605, the S-eNB sends the NAS message to the T-eNB via the NAS message forwarding tunnel established through steps 1601 and 1602. The S-eNB may forward the NAS message by containing the NAS message in an RRC message, for example, an RRC downlink direct-transfer message, or forward the NAS message directly.

In step 1606, the UE sends a handover acknowledgement message to the T-eNB.

In step 1607, the T-eNB sends a handover complete message to the EPC, so as to notify the EPC that the UE has completed the handover process.

In step 1608, the EPC sends a handover complete response message to the T-eNB, so as to confirm that the handover is completed.

In step 1609, the T-eNB sends the NAS message to the UE by using an RRC message downlink direct-transfer message.

Step 1609 may be performed immediately after step 1606 or step 1607.

In the above flow, if the handover fails, the T-eNB may return the NAS message to the S-eNB via the bi-directional tunnel established through steps 1601-1602, and then the S-eNB sends the NAS message to the UE.

Figure 14:
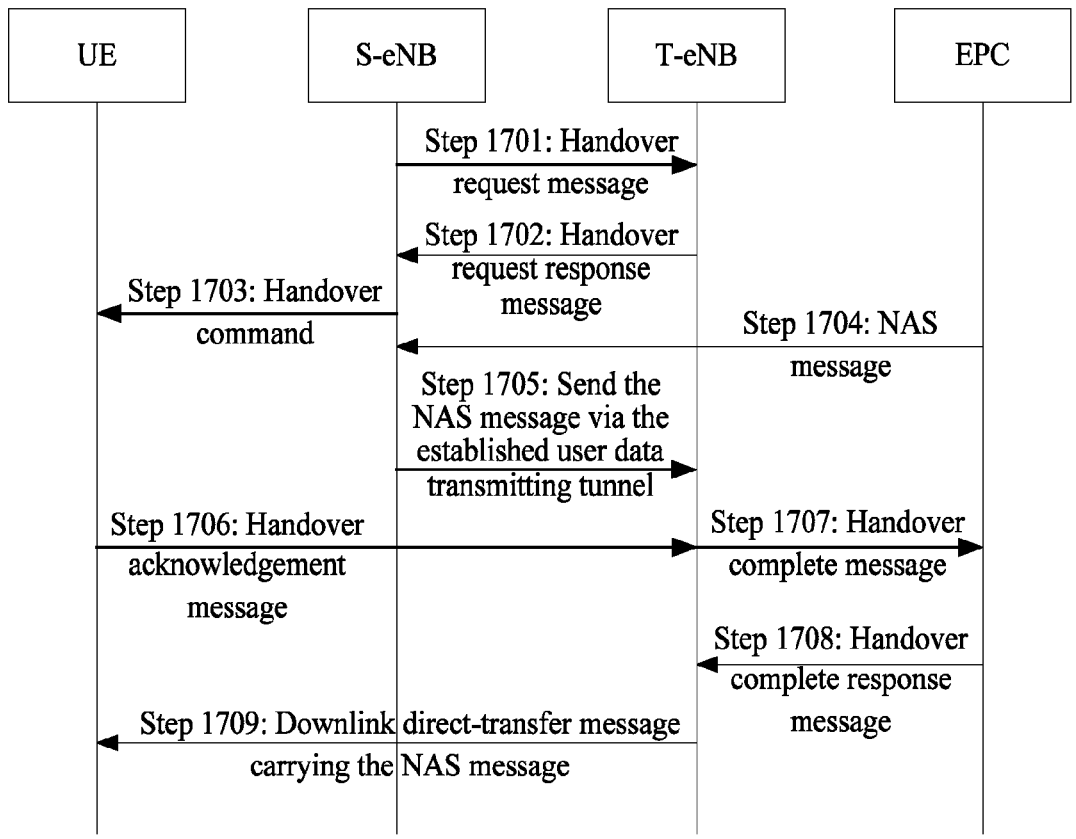
FIG. 14 is a schematic flowchart of a second preferred embodiment of the flow shown in FIG. 12.

FIG. 14 is a schematic flow chart of a second preferred embodiment of the flow shown in FIG. 12. The flow shown in FIG. 14 includes the following steps.

In step 1701, the S-eNB sends a handover request message to the T-eNB.

If the failure of the handover process is considered in this flow, the T-eNB returns the NAS message to the S-eNB. At this time, the handover request message in step 1701 may contain a user plane IP address of the S-eNB and a tunnel end point identifier for forwarding the NAS message.

In step 1702, the T-eNB sends a handover request response message to the S-eNB, and the message contains a user plane IP address of the T-eNB and a tunnel end point identifier for transmitting user data.

Through steps 1701-1702, a user data transmitting tunnel is established, which may be a unidirectional tunnel or a bidirectional tunnel.

Steps 1703-1704 are the same as steps 1603-1604.

In step 1705, the S-eNB sends the NAS message to the T-eNB via the user data transmitting tunnel established through steps 1701 and 1702. The S-eNB may forward the NAS message by containing the NAS message in an RRC message, for example, an RRC downlink direct-transfer message, or forward the NAS message directly. Steps 1706-1709 are the same as steps 1606-1609.

Step 1709 may be performed immediately after step 1706 or step 1707.

In the flow shown in FIG. 14, the S-eNB forwards the NAS message to the T-eNB via the user data transmitting tunnel. Before the NAS message is forwarded, a label needs to be added to the NAS message, so as to enable the T-eNB to identify messages transmitted via the same user data transmitting tunnel, thereby identifying the user data and the NAS message. The label may be added in various different ways, for example, adding a label field in a header of the GTP-U protocol.

The above user data transmitting tunnel for forwarding the NAS message may be one of a plurality of user data transmitting tunnels established between the S-eNB and the T-eNB. When a certain tunnel is selected for forwarding the NAS message while transmitting user data, various selection manners may be adopted, for example, selecting a tunnel according to a sequence, selecting a tunnel according to load sharing, or selecting a tunnel randomly, and the like.

In the above flow, if the handover fails, the T-eNB returns the NAS message to the S-eNB via the bi-directional tunnel established through steps 1801-1802, and then the S-eNB sends the NAS message to the UE.

Figure 15:
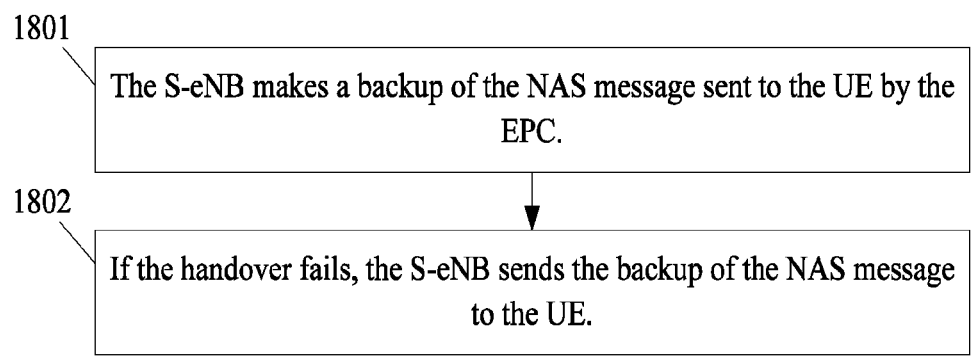
FIG. 15 is a schematic flowchart of the first preferred embodiment of the S-eNB sending an NAS message to a UE when the handover fails in the flow shown in FIG. 12.

In the flow shown in FIG. 12, when the handover fails, the S-eNB sends the NAS message to the UE, which particularly includes two implementation modes. FIG. 15 is a schematic flow chart of the first preferred embodiment of the S-eNB sending an NAS message to a UE when the handover fails in the flow shown in FIG. 12. The flow shown in FIG. 15 includes the following steps.

In step 1801, the S-eNB makes a backup of the NAS message sent to the UE by the EPC.

In step 1802, if the handover fails, the S-eNB sends the backup of the NAS message to the UE.

In this preferred embodiment, the S-eNB makes a backup of the NAS message, and when the handover fails, the S-eNB sends the backup of the NAS message to the UE, thereby realizing the effect of correctly sending the NAS message to the UE when the handover fails.

Before the S-eNB sends the backup of the NAS message to the UE, the S-eNB initiates a handover canceling flow to the T-eNB.

Figure 16:
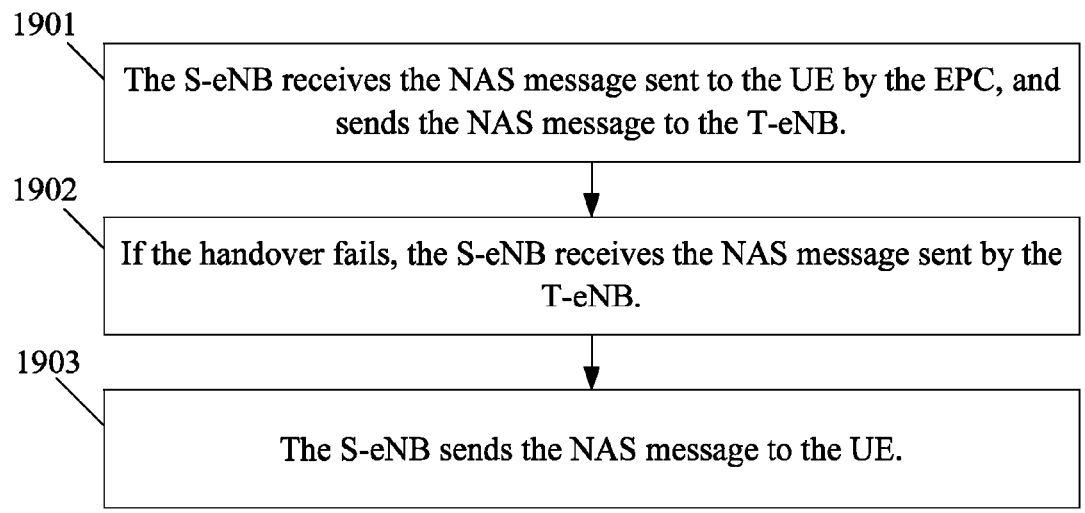
FIG. 16 is a schematic flowchart of the second preferred embodiment of the S-eNB sending an NAS message to a UE when the handover fails in the flow shown in FIG. 12.

FIG. 16 is a schematic flow chart of the second preferred embodiment of the S-eNB sending an NAS message to a UE when the handover fails in the flow shown in FIG. 12. The flow shown in FIG. 16 includes the following steps.

In step 1901, the S-eNB receives the NAS message sent to the UE by the EPC, and sends the NAS message to the T-eNB.

In step 1902, if the handover fails, the S-eNB receives the NAS message sent by the T-eNB.

In step 1903, the S-eNB sends the NAS message to the UE.

In this preferred embodiment, when the UE is being handed over, the S-eNB forwards the received NAS message to the T-eNB. If the handover fails, the T-eNB further forwards the NAS message back to the S-eNB, and then the S-eNB sends the NAS message to the UE. When the handover fails, the NAS message is forwarded between the S-eNB and the T-eNB, thereby realizing the effect of correctly sending the NAS message to the UE.

Before the S-eNB receives the NAS message sent by the T-eNB, the S-eNB further initiates a handover canceling process to the T-eNB.

Next, an apparatus for NAS message processing during handover in an evolved network according to an embodiment of the present invention is described below, which includes an eNodeB and an MME in an EPC, in which the MME in the EPC further includes two circumstances.

Figure 17:
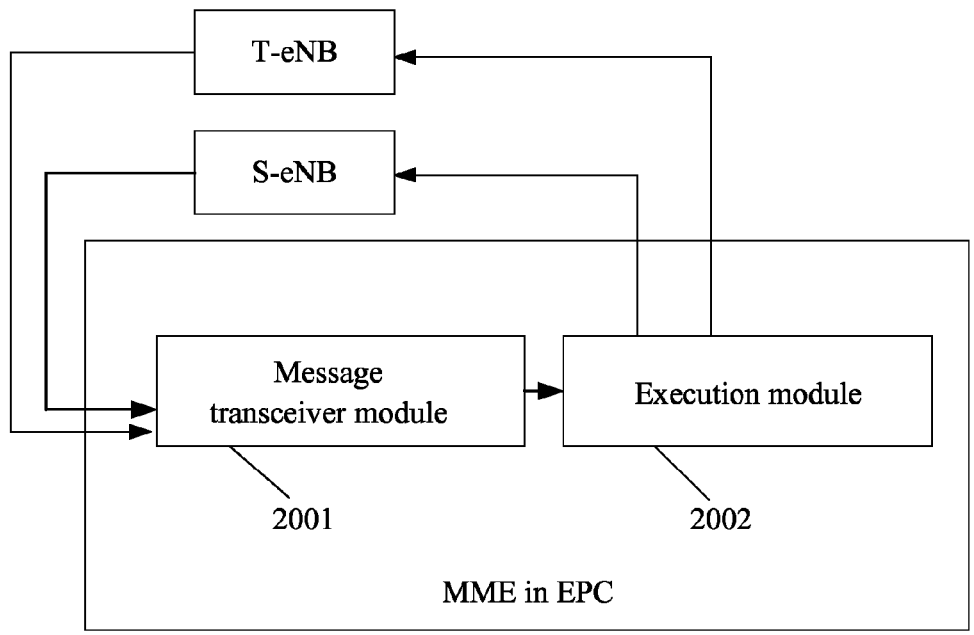
FIG. 17 is a schematic structural view of a first type of MME in an EPC according to an embodiment of the present invention.

FIG. 17 is a schematic structural view of a first type of MME in an EPC according to an embodiment of the present invention. The MME includes a message transceiver module 2001 and an execution module 2002.

The message transceiver module 2001 is configured to receive a message, which indicates that a UE is being handed over, sent by an S-eNB, and transmit the message to the execution module 2002; and receive a message, which indicates that the UE returns to an S-eNB service area, sent by the S-eNB when the handover fails, and transmit the message to the execution module 2002.

The execution module 2002 is configured to receive the message, which indicates that the UE is being handed over, transmitted by the message transceiver module 2001, and buffer an NAS message to be sent to the UE; and receive the message, which indicates that the UE returns to the S-eNB service area, transmitted by the message transceiver module 2001, and send to the S-eNB the NAS message to be sent to the UE when it is necessary to send the NAS message to the UE.

The first type of MME in the EPC according to an embodiment of the present invention acquires that the UE is being handed over through receiving the message which indicates that the UE is being handed over sent by the S-eNB, so as to buffer the NAS message to be sent to the UE. When the handover fails, the MME receives the message, which indicates that the UE returns to the S-eNB service area, sent by the S-eNB, and further sends the NAS message to the UE through the S-eNB when it is necessary to send the NAS message to the UE, thereby realizing the effect of correctly sending the NAS message to the UE when the handover fails.

The message transceiver module 2001 is further configured to receive a UE handover complete message sent by the T-eNB when the handover is successful, and transmit the message to the execution module 2002. The execution module 2002 is further configured to receive the UE handover complete message sent by the T-eNB and transmitted by the message transceiver module when the handover is successful, and send the NAS message to the UE when it is necessary to send the NAS message to the UE.

Therefore, the MME in the EPC according to an embodiment of the present invention can not only send the NAS message to the UE correctly through the S-eNB if it is necessary to send the NAS message to the UE when the handover fails, but also send the NAS message to the UE correctly through the T-eNB if it is necessary to send the NAS message to the UE when the handover is successful.

Figure 18:
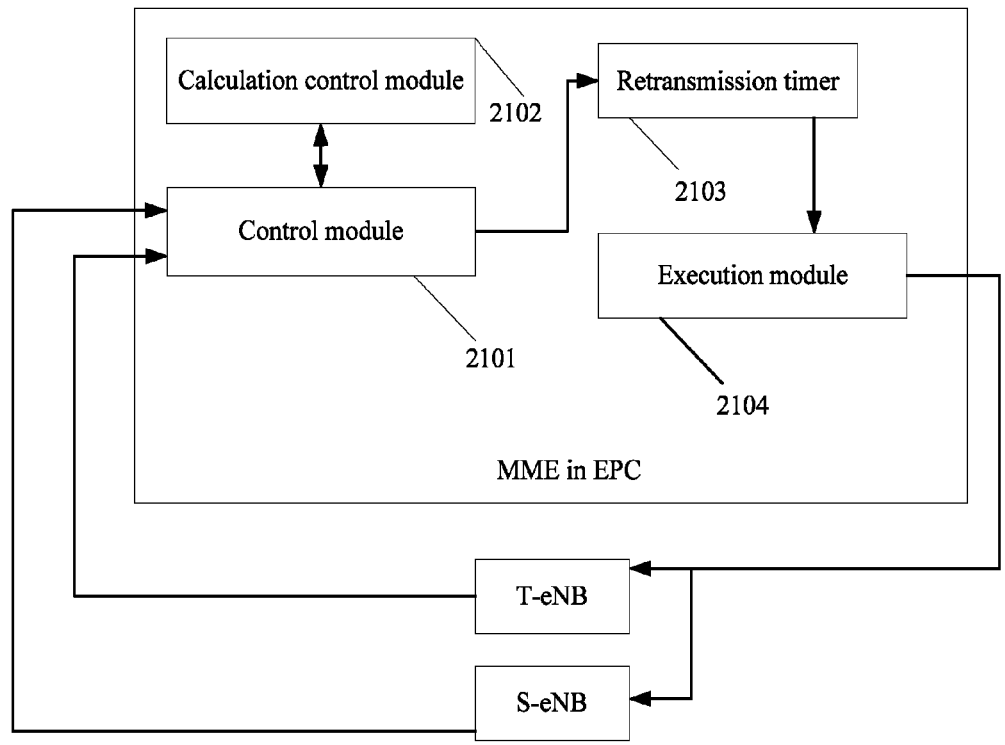
FIG. 18 is a schematic structural view of a second type of MME in an EPC according to an embodiment of the present invention.

FIG. 18 is a schematic structural view of a second type of MME in an EPC according to an embodiment of the present invention. The MME includes a control module 2101, a retransmission timer 2103, and an execution module 2104.

The control module 2101 is configured to receive a message, which indicates that a UE is being handed over, sent by an S-eNB, and start the retransmission timer 2103; receive a handover complete message sent by a T-eNB, and stop the retransmission timer 2103.

The execution module 2104 is configured to send an NAS message to the S-eNB according to a timing result of the retransmission timer 2103 when it is necessary to send the NAS message to the UE after the retransmission timer 2103 expires, and send the NAS message to the T-eNB when it is necessary to send the NAS message to the UE after the retransmission timer 2103 is stopped.

The second type of MME in the EPC according to an embodiment of the present invention acquires that the UE is being handed over through receiving the message which indicates that the UE is being handed over sent by the S-eNB, and starts the retransmission timer. When it is necessary to send the NAS message to the UE after the retransmission timer expires, the MME further sends the NAS message to the UE through the S-eNB. When the handover is successful, the MME stops the retransmission timer, and sends the NAS message to the UE through the T-eNB, thereby realizing the effect of correctly sending the NAS message to the UE when the handover is successful or when the handover fails.

The retransmission timer 2103 may be an S1 interface application part protocol retransmission timer.

The message which indicates that the UE is being handed over received by the control module 2101 contains time information, and in this case, the MME further includes a calculation control module 2102 configured to resolve the time information and calculate a time limit of the retransmission timer 2103 according to the time information, and then transmit the calculating result to the control module 2101.

If the message which indicates that the UE is being handed over contains the time information, the MME may accurately determine the time limit of the retransmission timer according to the time information.

Figure 19:
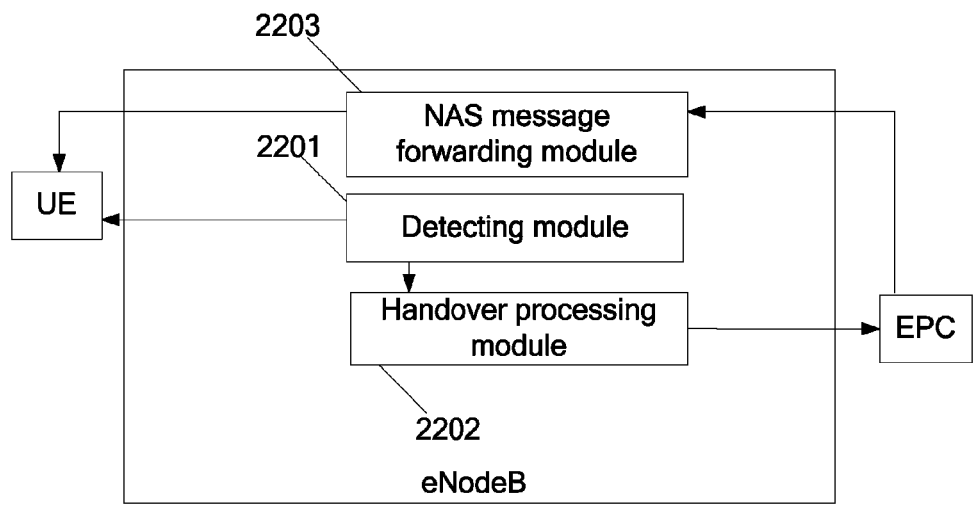
FIG. 19 is a schematic structural view of a first eNodeB according to an embodiment of the present invention.

Finally, three eNodeBs provided according to an embodiment of the present invention are described below in detail. FIG. 19 is a schematic structural view of a first eNodeB according to an embodiment of the present invention. The eNodeB includes a detecting module 2201, a handover processing module 2202, and an NAS message forwarding module 2203.

The detecting module 2201 is configured to detect an abnormal status during a handover of a UE, and send a detecting result to the handover processing module 2202.

The handover processing module 2202 is configured to send a message which indicates that the UE is being handed over to an EPC; and send to the EPC a message about a service area where the UE currently belongs to according to a detecting result sent by the detecting module 2201 when the handover of the UE fails.

The NAS message forwarding module 2203 is configured to receive the NAS message sent by the EPC and forward the NAS message to the UE.

In practical applications, the eNodeB may be an S-eNB or a T-eNB depending upon the specific application situation. Therefore, the first eNodeB provided according to an embodiment of the present invention includes the functions of both the S-eNB and the T-eNB.

The first eNodeB provided according to an embodiment of the present invention sends to the EPC the message about the service area where the UE currently belongs to when the handover fails, so as to enable the EPC to correctly send the NAS message to the UE according to the above message.

In practical applications, the eNodeB may be an S-eNB or a T-eNB depending upon the specific application situation. Therefore, the first eNodeB provided according to an embodiment of the present invention includes the functions of both the S-eNB and the T-eNB.

Figure 20:
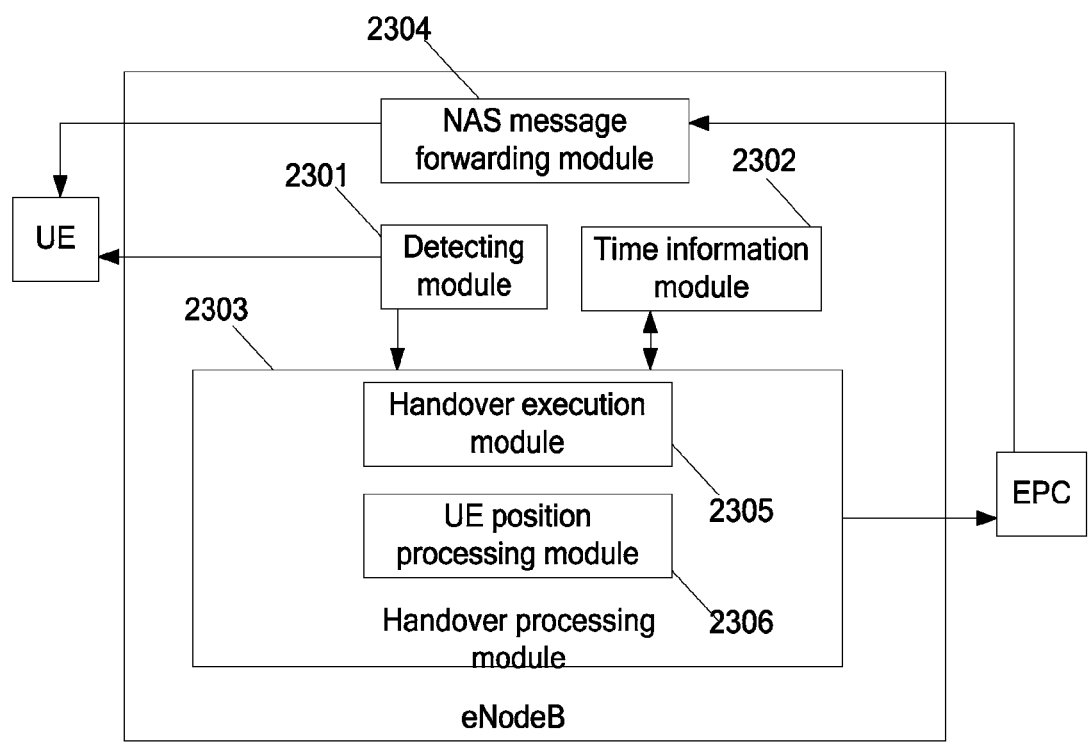
FIG. 20 is a schematic structural view of a second eNodeB according to an embodiment of the present invention.

FIG. 20 is a schematic structural view of a second eNodeB according to an embodiment of the present invention. The eNodeB includes a detecting module 2301, a time information module 2302, a handover processing module 2303, and an NAS message forwarding module 2304.

The detecting module 2301 is configured to detect an abnormal status during handover of a UE, and send a detecting result to the handover processing module 2303.

The time information module 2302 is configured to send time information corresponding to the handover of the UE to the handover processing module 2303 according to a processing result of the handover processing module 2303.

The handover processing module 2303 is configured to send a message which indicates that the UE is being handed over to an EPC, contain the time information provided by the time information module 2302 in the message which indicates that the UE is being handed over; and send to the EPC a message about a service area where the UE currently belongs to according to a detecting result sent by the detecting module 2301 when the handover of the UE fails. The handover processing module 2303 includes a handover execution module 2305 and a UE position processing module 2306. The handover execution module 2305 is configured to send a message which indicates that the UE is being handed over to the EPC, and contain the time information provided by the time information module 2302 in the message which indicates that the UE is being handed over. The UE position processing module 2306 is configured to send to the EPC a message about a service area where the UE currently belongs to according to the detecting result sent by the detecting module 2301 when the handover of the UE fails.

The NAS message forwarding module 2304 is configured to receive the NAS message sent by the EPC, and forward the NAS message to the UE.

The second eNodeB according to an embodiment of the present invention contains the time information in the message, which indicates that the UE is being handed over, sent to the EPC, so as to enable the EPC to determine a time limit of the retransmission timer according to the time information, thereby sending the NAS message correctly when the handover of the UE fails after the retransmission timer expires.

Figure 21:
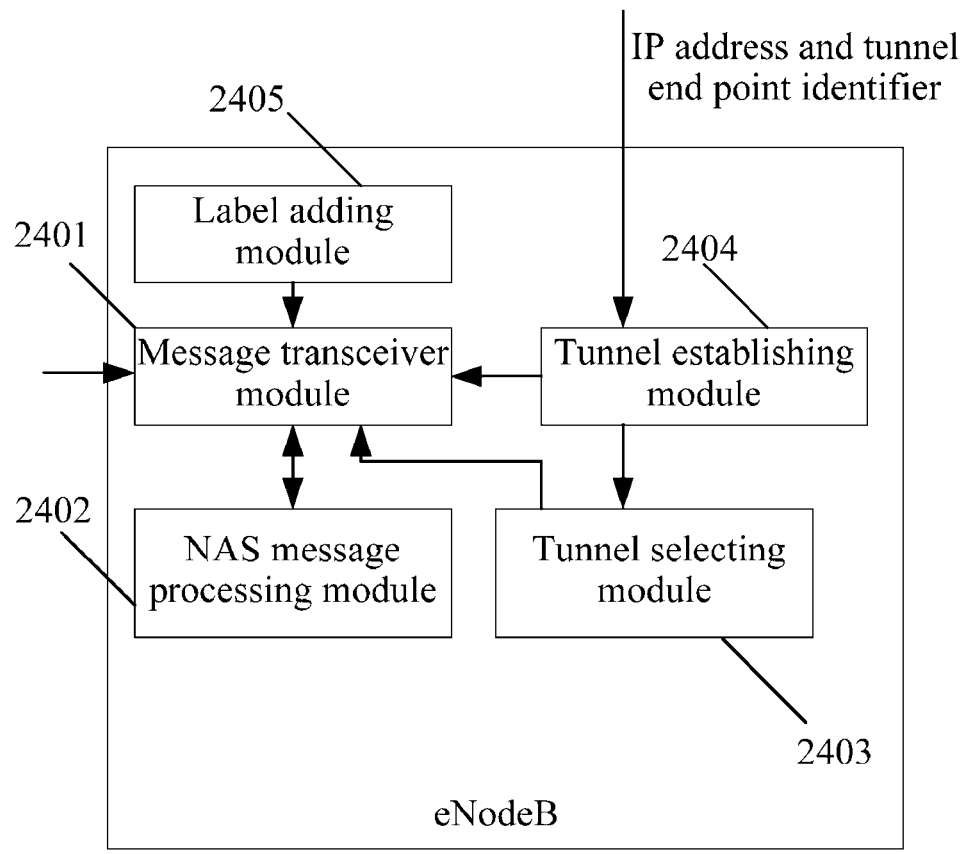
FIG. 21 is a schematic structural view of a third eNodeB according to an embodiment of the present invention.

FIG. 21 is a schematic structural view of a third eNodeB according to an embodiment of the present invention. The eNodeB includes a message transceiver module 2401 and an NAS message processing module 2402.

The message transceiver module 2401 is configured to receive an NAS message to be sent to a UE by an EPC, send an X2 interface control protocol message containing the NAS message in the NAS message processing module to another NodeB, or send the received NAS message to another NodeB via a tunnel; receive the NAS message sent by another eNodeB by using an X2 interface control protocol message or a tunnel, and send the received NAS message to the UE.

The NAS message processing module 2402 is configured to bear the NAS message received by the message transceiver module 2401 in the X2 interface control protocol message.

The third eNodeB provided according to an embodiment of the present invention bears the NAS message in the X2 interface control protocol message, and forwards the NAS message between eNodeBs by using the X2 interface control protocol message, or forwards the NAS message via a tunnel established between the eNodeBs, thereby providing a specific implementation manner for forwarding the NAS message at the X2 interface.

The third eNodeB according to an embodiment of the present invention further includes a tunnel establishing module 2403 configured to receive a user plane IP address and a tunnel end point identifier corresponding to another eNodeB, and send a user plane IP address and a tunnel end point identifier corresponding to the third eNodeB itself to the other eNodeB, thereby establishing an NAS forwarding tunnel or a user data transmitting tunnel between the third eNodeB itself and the other eNodeB.

If more than one user data transmitting tunnel is established, the third eNodeB provided according to an embodiment of the present invention further includes a tunnel selecting module 2404 configured to select one tunnel from the established user data transmitting tunnels to forward the NAS message. The eNodeB further includes a label adding module 2405 configured to add a label to the NAS message when the NAS message is sent to another eNodeB via the established user data transmitting tunnel. The addition of the label aims at enabling the eNodeB to correctly identify the received NAS message when the NAS message and the user data share the user data transmitting tunnel.

The third eNodeB provided according to an embodiment of the present invention further includes a backup module 2406 configured to make a backup of the NAS message to be sent to the UE received by the message transceiver module 2401. By adding the backup module 2405, if the handover fails, the eNodeB can send the backup of the NAS message to the UE.

The three eNodeBs provided in an embodiment of the present invention respectively includes the functions of the eNodeB serving as both an S-eNB and a T-eNB.

Figure 22:
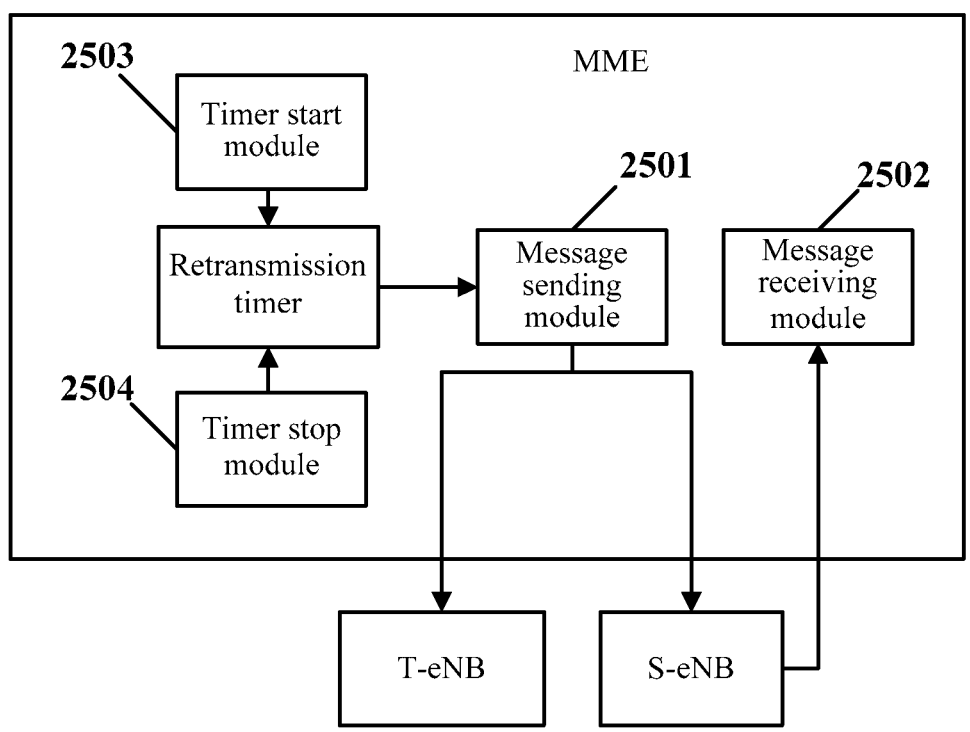
FIG. 22 is a schematic structural view of another MME according to an embodiment of the present invention.

FIG. 22 is a schematic structural view of an MME according to an embodiment of the present invention. The MME includes a message sending module 2501 and a message receiving module 2502.

The message sending module 2501 is configured to enable an EPC to send a direct-transfer message to an S-eNB, and the direct-transfer message contains an NAS message to be sent by the EPC to a UE.

The message receiving module 2502 is configured to enable the EPC to receive a message, which indicates that the UE is being handed over, sent by the S-eNB, and the message which indicates that the UE is being handed over is a direct transfer failure message or direct transfer response message containing a cause value and an NAS message that fails to be sent.

Furthermore, the MME further includes a timer start module 2503 and a timer stop module 2504.

The timer start module 2503 is configured to enable the EPC to start a retransmission timer. At this time, the message sending module 2501 is configured to enable the EPC to send the NAS message to the UE through the S-eNB when it is necessary to send the NAS message to the UE after the retransmission timer expires if the handover fails.

The timer stop module 2504 is configured to enable the EPC to receive a handover complete message sent by a T-eNB, and stop the retransmission timer. At this time, the message sending module 2501 is configured to enable the EPC to send the NAS message to the UE through the T-eNB when it is necessary to send the NAS message to the UE.

Through the method and the apparatus for NAS message processing during handover in an evolved network provided according to the embodiments of the present invention, an EPC is notified that the UE is currently being handed over, so that the EPC buffers an NAS message to be sent to the UE. If the handover fails, the S-eNB sends a message which indicates that the UE returns to an S-eNB service area to the EPC, so as to enable the EPC to send the NAS message to the UE correctly. Alternatively, a retransmission timer is set, and the EPC is notified that the UE is currently being handed over, so that the EPC starts the retransmission timer. If the handover fails, the EPC may send the NAS message to the UE correctly through the S-eNB after the retransmission timer expires. If the handover is successful, the EPC may stop the retransmission timer and send the NAS message to the UE through the T-eNB. Alternatively, the NAS message is forwarded to the T-eNB via an X2 interface control protocol or a tunnel, thereby providing specific implementation for forwarding the NAS message via the X2 interface.

The above descriptions are merely exemplary embodiments of the present invention, and not intended to limit the scope of the present invention. Any modification, equivalent replacement, or improvement made without departing from the spirit and principle of the present invention should fall within the scope of the present invention.

What is claimed is:

1. A method for processing a Non-access Stratum (NAS) message during a handover of a User Equipment (UE) in an evolved network, the method comprising:

sending, by a mobility management entity (MME), a direct-transfer message to an Source-eNodeB (S-eNB) during the handover of the UE, the direct-transfer message including the NAS message;

receiving, by the MME, a reply from the S-eNB, the reply including a cause value and the NAS message, the cause value indicating the NAS message has not been sent to the UE during the handover of the UE in the evolved network.

2. The method of claim 1, comprising:

buffering, by the MME, the NAS message after receiving the reply from the S-eNB; and sending, by the MME, the buffered NAS message to the UE through the S-eNB after failure of the handover of the UE.

3. A Mobility Management Entity (MME), comprising:

a message sending module, configured to send a direct-transfer message to an S-eNB during a handover of a User Equipment (UE) in an evolved network, the direct-transfer message including an NAS message to be sent to the UE;

a message receiving module, configured to receive a reply from the S-eNB, the reply including a cause value and the NAS message, the cause value indicating the NAS message has not been sent to the UE during the handover of the UE in the evolved network.

4. The MME of claim 3, further comprising:

a timer start module, configured to start a retransmission timer;

wherein the message sending module is further configured to send the NAS message to the UE through the S-eNB after the retransmission timer expires and the handover of the UE fails.

* * * * *